(12) United States Patent
Goto (10) Patent No.: US 7,446,839 B2
(45) Date of Patent: Nov. 4, 2008

(54) MANUFACTURING METHOD AND MANUFACTURING SYSTEM OF LIQUID CRYSTAL DISPLAY, LIQUID CRYSTAL DISPLAY, AND ELECTRONIC APPARATUS

(75) Inventor: Tamotsu Goto, Chino (JP)

(73) Assignee: Seiko Epson Corporation, Tokyo (JP)

( * ) Notice: Subject to any disclaimer, the term of this patent is extended or adjusted under 35 U.S.C. 154(b) by 442 days.

(21) Appl. No.: 11/101,445

(22) Filed: Apr. 8, 2005

(65) Prior Publication Data

US 2005/0264751 A1 Dec. 1, 2005

(30) Foreign Application Priority Data

Apr. 30, 2004 (JP) .............................. 2004-135945

(51) Int. Cl.
*G02F 1/1337* (2006.01)
(52) U.S. Cl. ...................................... 349/124
(58) Field of Classification Search .................. 349/123, 349/124, 187
See application file for complete search history.

(56) References Cited

U.S. PATENT DOCUMENTS

2004/0131861 A1* 7/2004 Chae et al. ............... 428/411.1
2005/0007530 A1* 1/2005 Hiruma ....................... 349/129
2005/0094074 A1* 5/2005 Kobayashi .................. 349/129
2007/0085952 A1* 4/2007 Morimoto et al. ........... 349/123

FOREIGN PATENT DOCUMENTS

| JP | A 09-105937 | 4/1997 |
|----|-------------|--------|
| JP | A-09-127509 | 5/1997 |
| JP | A-2000-135467 | 5/2000 |
| JP | A-2002-023165 | 1/2002 |

* cited by examiner

*Primary Examiner*—James A Dudek
(74) *Attorney, Agent, or Firm*—Oliff & Berridge (57) ABSTRACT

Aspects of the invention can provide a manufacturing method and a manufacturing system of a liquid crystal display which forms a homogeneous alignment layer by changing, depending on the specific area on a substrate, the quantity of an alignment layer material to be applied. The substrate, such as a substrate on which segment electrodes are formed, is conveyed via a belt conveyor which is driven by a driving gear according to signals from a control device, and is cleaned on a cleaning device. Then on a discharge device, an alignment layer material, the quantity of which differs depending on the specific area, can be applied on the substrate which is conveyed via the belt conveyor. Then, the alignment layer material applied on the substrate can be preliminarily dehydrated on a dehydrating device, and the substrate is burned on a burning device to form an alignment layer. Then, a rubbing process can be carried out onto the alignment layer on a rubbing device.

10 Claims, 8 Drawing Sheets

MANUFACTURING METHOD AND MANUFACTURING SYSTEM OF LIQUID CRYSTAL DISPLAY, LIQUID CRYSTAL DISPLAY, AND ELECTRONIC APPARATUS

BACKGROUND

Aspects of the invention relate to a manufacturing method and a manufacturing system of a liquid crystal display having a liquid crystal layer interposed between a pair of substrates, a liquid crystal display and an electronic apparatus.

Related art liquid crystal displays have a liquid crystal layer composed of liquid crystal composition and interposed between a pair of substrates on which electrodes are formed, and voltages are applied to the liquid crystal composition via the electrodes on each of the substrates to display images. Related art liquid crystal displays use an alignment layer for aligning liquid crystal molecules in a specific orientation in order to achieve uniform display when voltages are applied. As related art methods for forming an alignment layer on a substrate, there are a plurality of printing methods, such as Flexo printing and offset printing. In Flexo printing, for example, a liquid solution containing an alignment layer material is transferred on a substrate by printing. The applied solution is heated at a predetermined temperature to volatilize a solvent component and then baked at a predetermined temperature to form an alignment layer.

A method for forming an alignment layer of a liquid crystal display is disclosed in, for example, Japanese Unexamined Patent Publication No. 9-105937 to improve efficiency in use of an alignment layer material and apply the alignment layer material uniformly. In this related art method for forming an alignment layer of a liquid crystal display, an alignment layer is applied uniformly on a substrate by repeating a process of spray-applying, via inkjet nozzles, an alignment layer forming solution onto a transparent substrate on which electrodes are formed.

SUMMARY

Generally, in printing methods, the viscosity of a liquid solution containing an alignment layer material is adjusted to about 40 to 60 mPa.s for convenience of printing. Therefore, there is a problem that the high viscosity of the liquid solution easily causes unevenness in printing when the liquid solution is transferred on a substrate, which accordingly results in display defect. Meanwhile, when inkjet nozzles are used, an alignment layer material with the same viscosity as that in printing methods cannot be discharged via inkjet nozzles. Therefore, the viscosity of a liquid solution (ink) containing an alignment layer material is adjusted to less than 10 mPa.s by increasing the quantity of the solvent component.

Consequently, it is necessary to apply a larger quantity of a liquid solution on a substrate in order to form an alignment layer with the same thickness as that by printing methods. Meanwhile, the occurrence of unevenness in printing can be prevented unlike the case of transferring the liquid solution on a substrate. However, in the case where an alignment layer material with a low viscosity is applied on a substrate, the alignment layer formed on the marginal part of the substrate becomes thicker than the alignment layer formed on the central part of the substrate as a result of volatilizing the solvent in the drying process, even if the alignment layer material is applied uniformly on the substrate. Specifically, the alignment layer formed on the marginal part becomes thicker than the alignment layer formed on the central part, because in the drying process, the alignment layer material on the marginal part of the substrate is dried ahead of that on the central part and thus lowering of the liquid level of the alignment layer material on the marginal part is caused, inducing the liquid solution on the central part to flow into the marginal part. Thus, there is a problem that applying an alignment layer material uniformly rather causes unevenness in the resulting alignment layer, which causes display defect.

An advantage of the invention is to provide a manufacturing method and a manufacturing system of a liquid crystal display for forming a uniform alignment layer on a substrate by changing, depending on specific areas on the substrate, the quantity of an alignment layer material to be applied, a liquid crystal display manufactured in accordance with the liquid crystal display manufacturing method, and an electronic apparatus having the liquid crystal display manufactured thereby.

A first aspect of the invention can provide a manufacturing method of a liquid crystal display having a liquid crystal layer interposed between a pair of substrates. The manufacturing method can include discharging a droplet containing an alignment layer material onto the substrate, and drying the alignment layer material applied in the discharging of a droplet to form an alignment layer. In the discharging of a droplet, different quantities of the alignment layer material are applied by using a droplet discharge device depending on a specific area on the substrate.

According to the liquid crystal display manufacturing method, different quantities of an alignment layer material can be applied by using a droplet discharge device depending on a specific area on a substrate. Specifically, different quantities of an alignment layer material are applied depending on the specific area by changing, depending on the specific area, the quantity of droplets containing the alignment layer material to be discharged. Therefore, by applying, on the part where the alignment layer becomes thicker when an alignment layer material is applied uniformly on the substrate, a smaller quantity of an alignment layer material than that on the rest, the thickness of an alignment layer that will be formed through the drying of the alignment layer material and the volatilization of the solvent can be equalized. Accordingly, display defect can appropriately and easily be suppressed.

Further, in the liquid crystal display manufacturing method according to the first aspect of the invention, the discharging of a droplet may include changing, depending on the specific area, the size of the droplet containing the alignment layer material to be discharged onto the substrate by the droplet discharge device to apply different quantities of the alignment layer material depending on the specific area.

Further, in the liquid crystal display manufacturing method according to the first aspect of the invention, the discharging of a droplet may include changing, depending on the specific area, the drop density of the droplet containing the alignment layer material to be discharged onto the substrate by the droplet discharge device to apply different quantities of the alignment layer material depending on the specific area.

According to the liquid crystal display manufacturing method, different quantities of an alignment layer material are applied depending on the specific area by changing, depending on the specific area, the size or the drop density of droplets containing the alignment layer material to be discharged by the droplet discharge device. Therefore, the needed quantity of an alignment layer material can be precisely applied on the specific area, which leads to the formation of a uniform alignment layer and accordingly to the suppression of display defect.

Further, in the liquid crystal display manufacturing method according to the first aspect of the invention, the discharging of a droplet may include dividing a specific area, on a substrate, to which the droplet containing the alignment layer material is discharged into a marginal area and a central area surrounded by the marginal area to apply a smaller quantity of the alignment layer material on the marginal area than the quantity of the alignment layer material applied on the central area.

According to the liquid crystal display manufacturing method, the specific area on a substrate can be divided into a marginal area and a central area, and a smaller quantity of an alignment layer material is applied on the marginal area than the quantity of the alignment layer material applied on the central area. Specifically, by applying on the marginal area, where it is experientially known that the alignment layer becomes thicker than that on the central area when an alignment layer material is applied uniformly on the substrate, a smaller quantity of an alignment layer material than that on the central part, a uniform alignment layer can be formed and display defect can accordingly be suppressed.

Further, a second aspect of the invention can provide a manufacturing system of a liquid crystal display having a liquid crystal layer interposed between a pair of substrates. The manufacturing system can include a droplet discharge device for discharging a droplet containing an alignment layer material to be applied on a substrate, and a drying device for drying the alignment layer material applied by the droplet discharge device on the substrate to form an alignment layer. The droplet discharge device can apply different quantities of the alignment layer material depending on the specific area on the substrate.

According to the liquid crystal display manufacturing system, different quantities of an alignment layer material are applied depending on the specific area on a substrate. Specifically, different quantities of an alignment layer material are applied depending on the specific area by changing, depending on the specific area, the quantity of droplets containing the alignment layer material to be discharged. Therefore, by applying on the part where the alignment layer becomes thicker than that on the rest when an alignment layer material is uniformly applied on a substrate, a smaller quantity of an alignment layer material than that on the rest, the thickness of the alignment layer that will be formed through the drying of the alignment layer material and the volatilization of the solvent can be equalized and display defect can accordingly be suppressed, appropriately and easily.

Further, in the liquid crystal display manufacturing system according to the second aspect of the invention, the droplet discharge device may change, depending on the specific area, the size of the droplet containing the alignment layer material to be discharged onto the substrate to apply different quantities of the alignment layer material depending on the specific area.

Further, in the liquid crystal display manufacturing system according to the second aspect of the invention, the droplet discharge device may change, depending on the specific area, the drop density of the droplet containing the alignment layer material to be discharged onto the substrate to apply different quantities of the alignment layer material depending on the specific area.

According to the exemplary liquid crystal display manufacturing system, different quantities of an alignment layer material can be applied depending on the specific area by changing, depending on the specific area, the size or the drop density of droplets containing the alignment layer material to be discharged by the droplet discharge device. Specifically, the needed quantity of an alignment layer material can be precisely applied on the specific area only by changing the size or the drop density of droplets to be discharged by the droplet discharge device. Therefore, a uniform alignment layer can easily be formed and display defect can accordingly be suppressed without taking troubles, such as installing new systems and revamping the current manufacturing line.

Further, in the liquid crystal display manufacturing system according to the second aspect of the invention, the specific area, on a substrate, to which the droplet containing the alignment layer material is discharged may be divided into a marginal area and a central area surrounded by the marginal area. In addition, the droplet discharge device may apply a smaller quantity of the alignment layer material on the marginal area than the quantity of the alignment layer material applied on the central area.

According to the liquid crystal display manufacturing system, because the specific area on a substrate is divided into a marginal area and a central area and then a smaller quantity of an alignment layer material is applied on the marginal area than that on the central area, an alignment layer having uniform thickness after being dried can easily be formed, and thus display defect can be appropriately suppressed.

Further, a liquid crystal display according to a third aspect of the invention can be manufactured in accordance with the liquid crystal display manufacturing method according to the first aspect of the invention. According to the liquid crystal display, display defect is appropriately suppressed because it is manufactured in accordance with the liquid crystal display manufacturing method according to the first aspect of the invention.

Further, an electronic apparatus according to a fourth aspect of the invention can include the liquid crystal display in accordance with the third aspect of the invention. According to the electronic apparatus, the yield rate of electronic apparatuses can be improved and the manufacturing cost of electronic apparatuses can be reduced because the electronic apparatus includes a liquid crystal display in which display defect is appropriately suppressed.

BRIEF DESCRIPTION OF THE DRAWINGS

This invention will be described with reference to the accompanying drawings, wherein like numerals reference like elements, and wherein.

DETAILED DESCRIPTION OF EMBODIMENTS

A liquid crystal display manufacturing system according to an exemplary embodiment of the invention will be described below with reference to the drawings.

Figure 1:
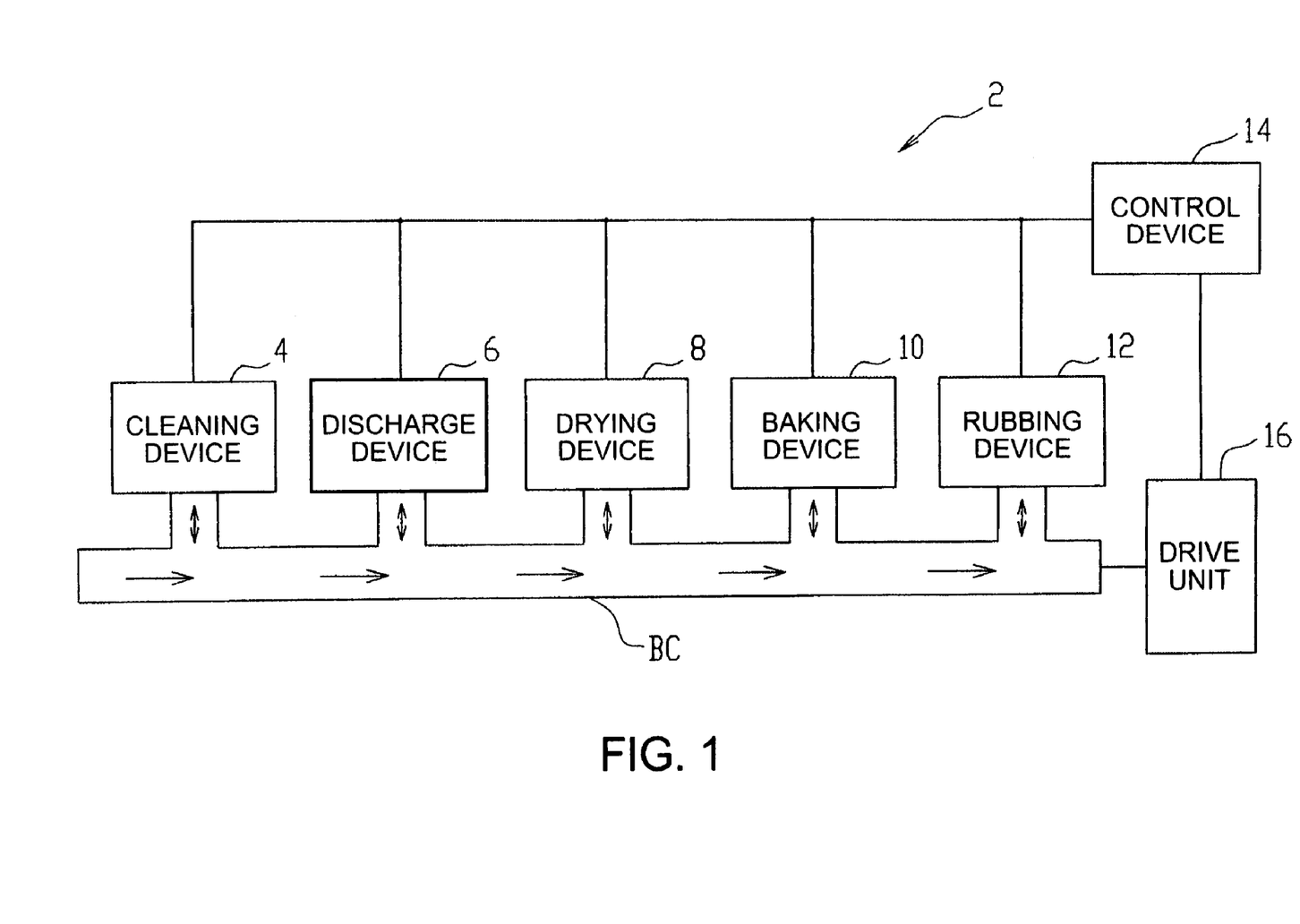
FIG. 1 is a block diagram showing an example of a liquid crystal display manufacturing line according to an exemplary embodiment of the invention.

FIG. 1 is a diagram showing an example of the configuration of a liquid crystal display manufacturing system (a liquid crystal display manufacturing line) according to an exemplary embodiment of the invention. As shown in FIG. 1, a liquid crystal display manufacturing line 2 can include a cleaning device 4, a discharge device (a droplet discharge device) 6, a drying device 8, a baking device 10, and a rubbing device 12, each device being used in the corresponding process, and a belt conveyor BC for connecting these devices, a drive unit 16 for driving the belt conveyor BC, and a control device 14 for controlling the entire liquid crystal display manufacturing line 2. The cleaning device 4, the discharge device 6, the drying device 8, the baking device 10, and the rubbing device 12 are allocated in a line at specific intervals along the belt conveyor BC.

The control device 14 can be coupled to the cleaning device 4, the discharge device 6, the drying device 8, the baking device 10, the rubbing device 12, and the drive unit 16. The drive unit 16 drives the belt conveyor BC according to control signals from the control device 14 to convey a substrate of a liquid crystal display (hereinafter simply referred to as a substrate) to the cleaning device 4, the discharge device 6, the drying device 8, the baking device 10, and the rubbing device 12. A substrate is cleaned at the cleaning device 4, and then an alignment layer material is applied on the substrate, specifically, droplets containing an alignment layer material are discharged onto the substrate at the discharge device 6, and thereafter the alignment layer material is dried preliminarily at the drying device 8. Further, the dried alignment layer material is baked at the baking device 10, and then the alignment layer is rubbed at the rubbing device 12. The preliminary drying carried out at the drying device 8 and the baking process carried out at the baking device 10 correspond to a drying process collectively.

Figure 2:
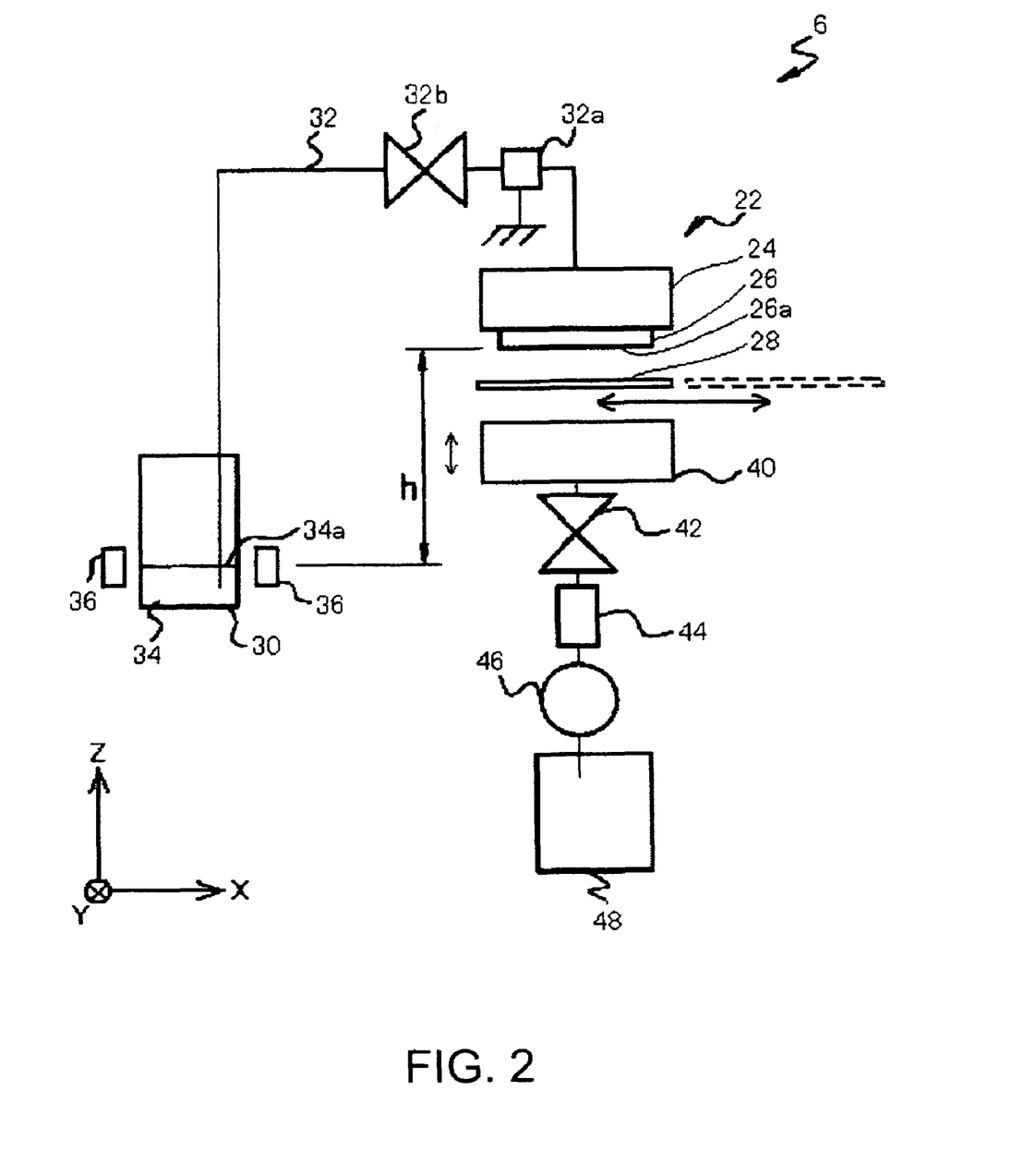
FIG. 2 is a schematic diagram of an inkjet discharge device according to the exemplary embodiment.

FIG. 2 is a diagram schematically showing the configuration of the inkjet discharge device 6 that is used as a droplet discharge device according to the exemplary embodiment of the invention. The discharge device 6 can include an inkjet head 22 for discharging liquid matter on a substrate. The inkjet head 22 includes a main body 24 and a nozzle surface 26 on which a plurality of nozzles for discharging liquid matter is formed. From the nozzles on the nozzle surface 26, liquid matter, specifically ink containing an alignment layer material to form an alignment layer on a substrate (droplets containing an alignment layer material, hereinafter simply referred to as an alignment layer material) is discharged. The discharge device 6 includes a table 28 on which to place a substrate. The table 28 is set up so as to move in specific directions, such as axially along the X-axis, the Y-axis, and the Z-axis. In addition, the table 28 moves axially along the X-axis as shown with an arrow in the drawing, and thereby a substrate that is conveyed via the belt conveyor BC is placed onto the table 28 and then is brought into the discharge device 6.

Further, a tank 30 containing an alignment layer material, which is liquid matter to be discharged from the nozzles on the nozzle surface 26, is connected to the inkjet head 22. Specifically, the tank 30 and the inkjet head 22 are connected via an liquid matter conveying tube 32 that conveys liquid matter. The liquid matter conveying tube 32 can include, on the flow channel of the liquid matter, an earth joint 32a for preventing electrification in the flow channel of the liquid matter conveying tube 32, and an air bubble elimination valve 32b for eliminating air bubbles from the head. The air bubble elimination valve 32b is used for sucking liquid matter in the inkjet head 22 with a suction cap 40 to be described in greater detail below. Specifically, when liquid matter in the inkjet head 22 is sucked with the suction cap 40, the air bubble elimination valve 32b is closed in order to prevent the liquid matter from flowing into the head from the tank 30. Suction with the suction cap 40 enhances the flowing rate of the liquid matter to be sucked, and thus air bubbles in the inkjet head 22 are drained quickly.

Further, the discharge device 6 can include a liquid level sensor 36 for controlling the quantity of liquid matter contained in the tank 30, specifically the height of the liquid level 34a of the alignment layer material contained in the tank 30. The liquid level sensor 36 is intended to keep the height difference "h" (called as a water head value hereafter) between a forefront 26a of the nozzle surface 26 of the inkjet head 22 and the liquid level 34a in the tank 30 within a predetermined range. Controlling the height of the liquid level 34a allows liquid matter 34 in the tank 30 to be sent to the inkjet head 22 with pressure within a predetermined range. Sending the liquid matter 34 with pressure within a predetermined range allows the liquid matter 34 to be stably discharged from the inkjet head 22.

Further, the suction cap 40 for sucking the liquid matter in the nozzles of the inkjet head 22 is placed oppositely, at a certain distance, to the nozzle surface 26 of the inkjet head 22. The suction cap 40 moves axially along the Z-axis, as shown with an arrow in FIG. 2, so as to be brought into close contact with the nozzle surface 26 in a manner of surrounding the plural nozzles on the nozzle surface 26, thereby forming a hermetically sealed space with the nozzle surface 26 to shield the nozzles from the air. Further, suction of the liquid matter in the nozzles of the inkjet head 22 with the suction cap 40 is carried out when the inkjet head 22 is not discharging the liquid matter 34, such as when the inkjet head 22 is retreated to a certain position and the table 28 is retreated to the position shown in FIG. 2 with the dashed line.

Further, there is a flow channel beneath the suction cap 40. A suction valve 42, a suction pressure sensor 44 for detecting abnormal suction, and a suction pump 46 formed of a tube pump and the like are placed on the flow channel. The liquid matter 34 sucked by the suction pump 46 or the like and conveyed through the flow channel is contained in a waste liquid tank 48.

Figure 3:
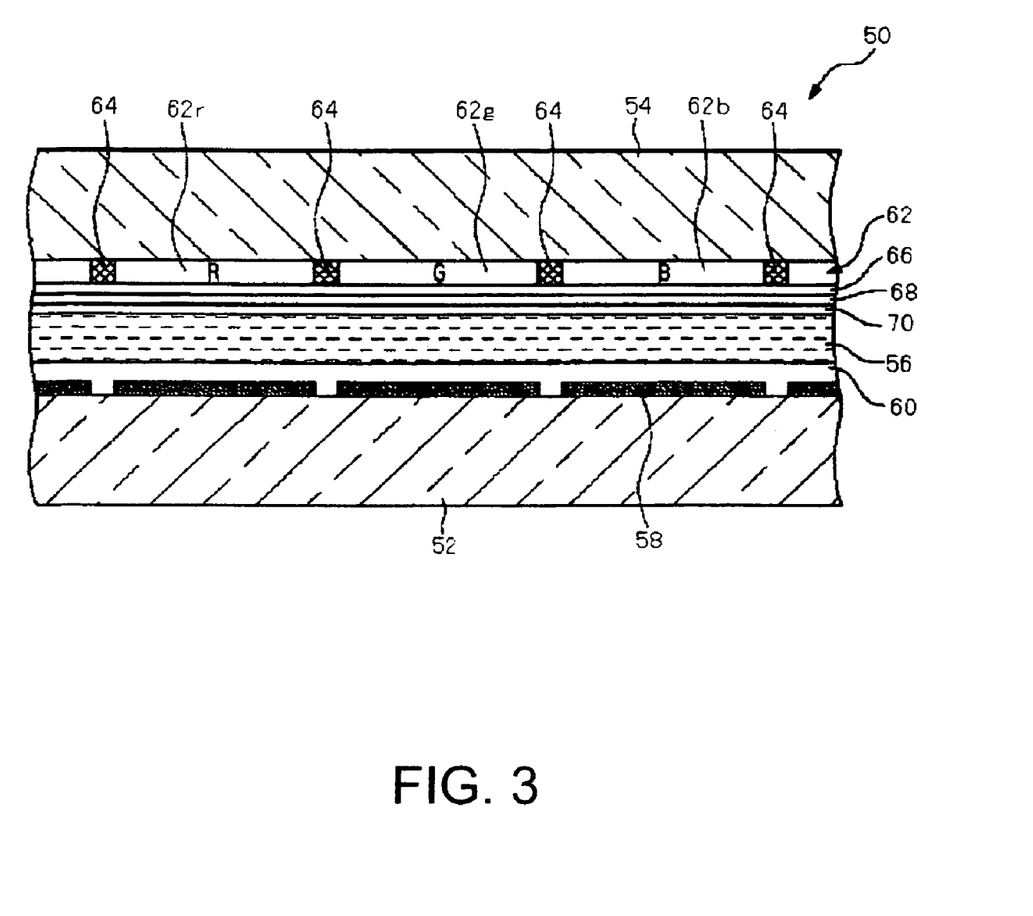
FIG. 3 is a schematic sectional view of a liquid crystal display according to the exemplary embodiment.

The outline of liquid crystal displays will now be described. FIG. 3 is a diagram schematically showing a section of a liquid crystal display. As shown in FIG. 3, a liquid crystal display 50 can include a substrate 52 and a substrate 54 that are made of glass, plastic or other material and face each other with the intermediary of seal materials and spacers (not shown). A liquid crystal 56 composed of super twisted nematic (STN) liquid crystal or the like is interposed between the substrates 52 and 54.

Between the substrate 52 and the liquid crystal 56, a plurality of segment electrodes 58 and an alignment layer 60 are formed over the substrate 52 in that order from the substrate 52. The segment electrodes 58 are formed in a stripe, as shown in FIG. 3, and are formed of a transparent conductive film, such as a indium tin oxide (hereinafter, referred to as "ITO") film or the like. The alignment layer 60 is formed of polyimide resin or the like.

Further, between the substrate 54 and the liquid crystal 56, a color filter 62, an overcoat film 66, a common electrode 68, and an alignment layer 70 are formed over the substrate 54 in that order from the substrate 54. The color filter 62 is formed of colored layers 62r (red), 62g (green), and 62b (blue), and black matrices 64 are formed between each of the colored layers 62r, 62g, and 62b constituting the color filter 62, wherein the black matrices 64 are formed of resin black or metal, such as chromium (Cr), whose reflectance of light is low. In addition, the colored layers 62r, 62g, and 62b constituting the color filter 62 are positioned oppositely to the segment electrodes 58 formed on the substrate 52.

Further, the overcoat film 66, which is formed of an inorganic film, such as an acrylic resin, polyimide resin, or silicon oxide film, is intended to flatten out steps among the colored layers 62r, 62g, and 62b and to protect the surfaces of the colored layers. The common electrode 68 can be formed of a transparent conductive film, such as an ITO film, and is formed in a stripe along the direction orthogonal to the segment electrodes 58 formed on the substrate 52. The alignment layer 70 is formed of polyimide resin or the like. The formation of the alignment layer on the substrate 52 on which the segment electrodes 58 are formed, or that on the substrate 54 on which the color filter 62, black matrices 64, the overcoat film 66 and the common electrode 68 are formed will be described in detail below.

Figure 4:
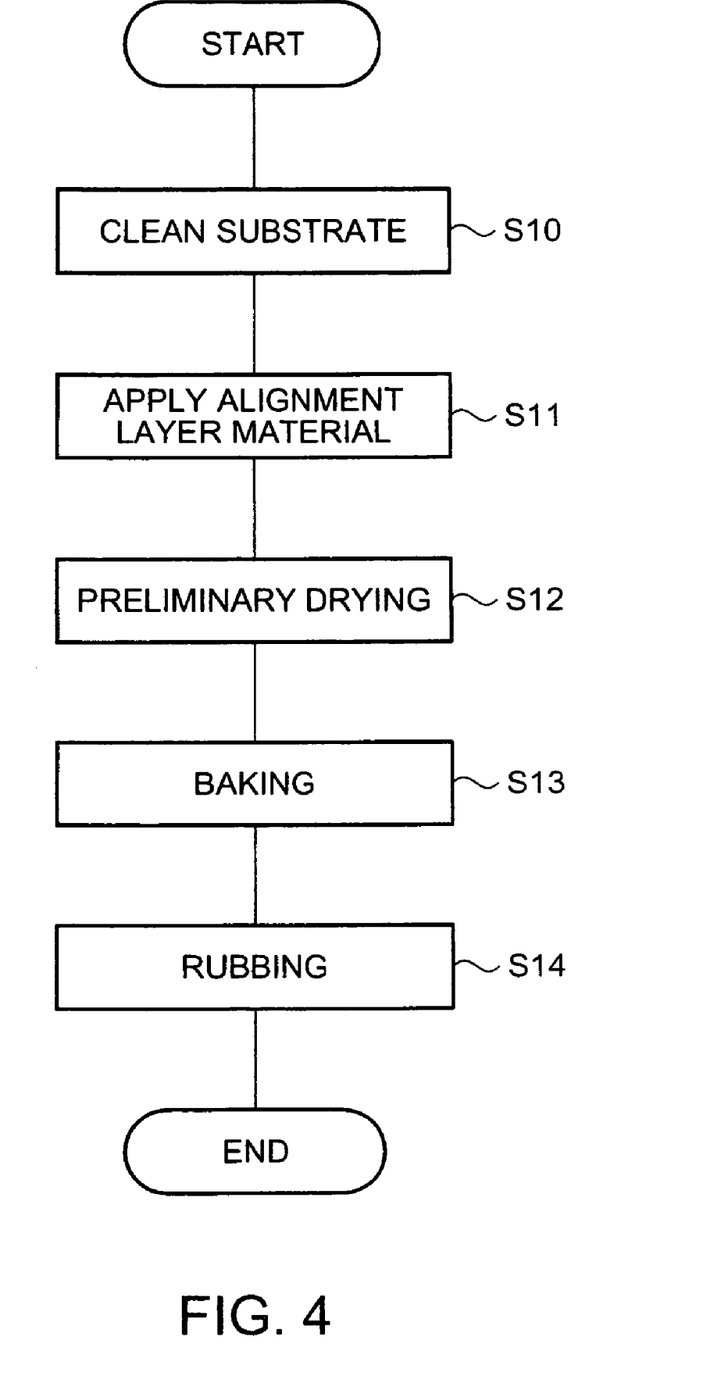
FIG. 4 is a flowchart of a liquid crystal display manufacturing method according to the exemplary embodiment.

A liquid crystal display manufacturing method with the liquid crystal display manufacturing line according to the exemplary embodiment of the invention will be described with reference to the flowchart in FIG. 4.

First, a substrate on which to form an alignment layer is cleaned (Step S10). For example, the substrate 52 on which the segment electrodes 58 are formed is conveyed to the cleaning device 4 via the belt conveyor BC. Then, the substrate 52 conveyed via the belt conveyor BC is brought into the cleaning device 4 to be cleaned using an alkali detergent, purified water and the like. Then, the substrate 52 is dried at a predetermined temperature and for a predetermined period of time, such as at 80 to 90 degrees centigrade and for 5 to 10 minutes. The substrate 52 is conveyed to the discharge device 6 via the belt conveyor BC after being cleaned and dried.

Next, an alignment layer material is applied on the substrate that is cleaned in the Step S10 (Step S11). Specifically, the substrate that is conveyed to the discharge device 6 via the belt conveyor BC, such as the substrate 52, is first placed onto the table 28 and brought into the discharge device 6. At the discharge device 6, the alignment layer material contained in the tank 30 is discharged from the nozzles on the nozzle surface 26 to apply the alignment layer material on the substrate 52. Hereinafter, the process for applying an alignment layer material on a substrate will be described with reference to the drawings.

Figure 5:
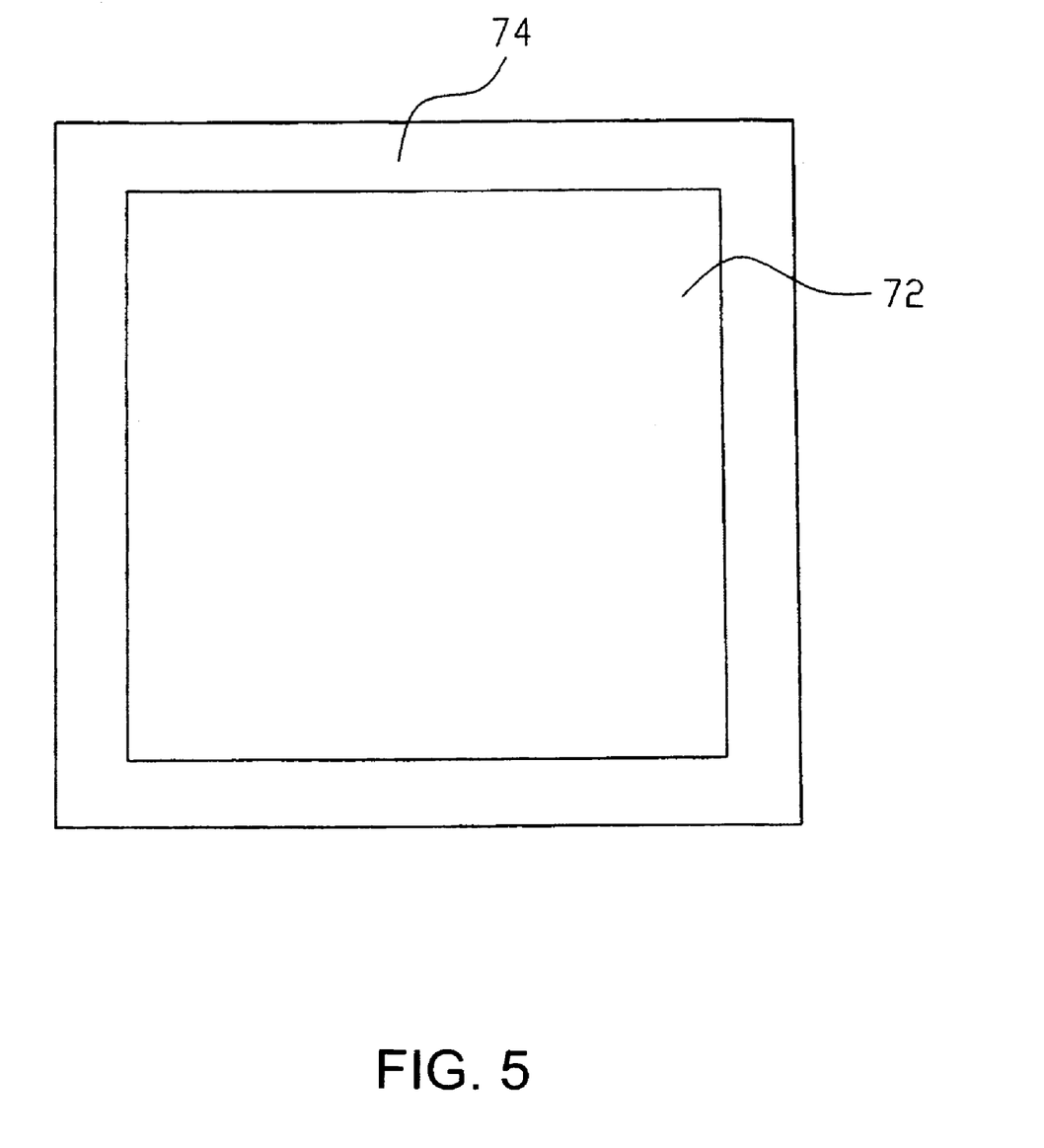
FIG. 5 is a diagram showing an example of areas for applying an alignment layer material according to the exemplary embodiment.

FIG. 5 is a diagram for explaining an area, on a substrate, to which an alignment layer material is to be applied (hereinafter, simply referred to as material applying area) according to the exemplary embodiment of the invention. The material applying area is, as shown in FIG. 5, divided into a central part (a central area) 72 and a marginal part (a marginal area) 74. Here, in FIG. 5, the marginal part corresponds to a peripheral area with the width of 2 mm of the material applying area, and the central part 72 corresponds to the area surrounded by the marginal part. Specifically, it is experientially known that the alignment layer formed on the marginal part 74 becomes thicker than the alignment layer formed on the central part 72, when an alignment layer material is uniformly applied on the entire material applying area, including the central part 72 and the marginal part 74. Meanwhile, even if an alignment layer is formed through the same processes and on the same conditions, the area where the alignment layer becomes thicker than that on the central part and the thickness difference between the alignment layer formed on the central part and the alignment layer formed on the marginal part differ depending on the type of alignment layers, solvent component, and the percentage of the solvent component. Therefore, the area that is experimentally known to have the alignment layer of a larger thickness thereon than that on the central part, as described above, corresponds to the marginal part.

Figure 6A:
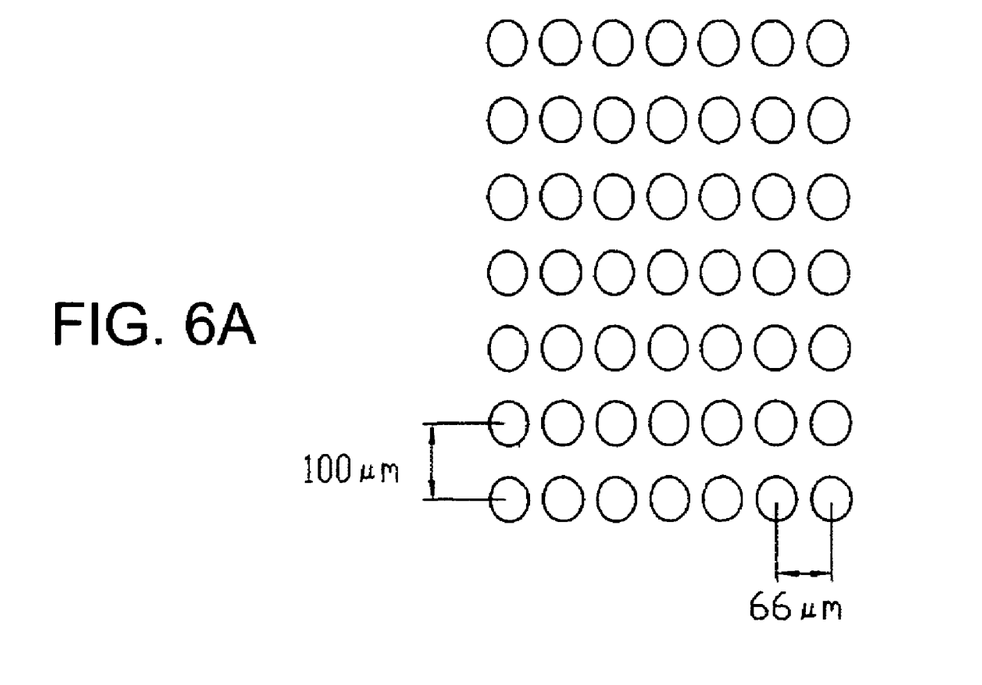
FIGS. 6A and 6B are diagrams explaining the size of droplets of an alignment layer material according to the exemplary embodiment.
Figure 6B:
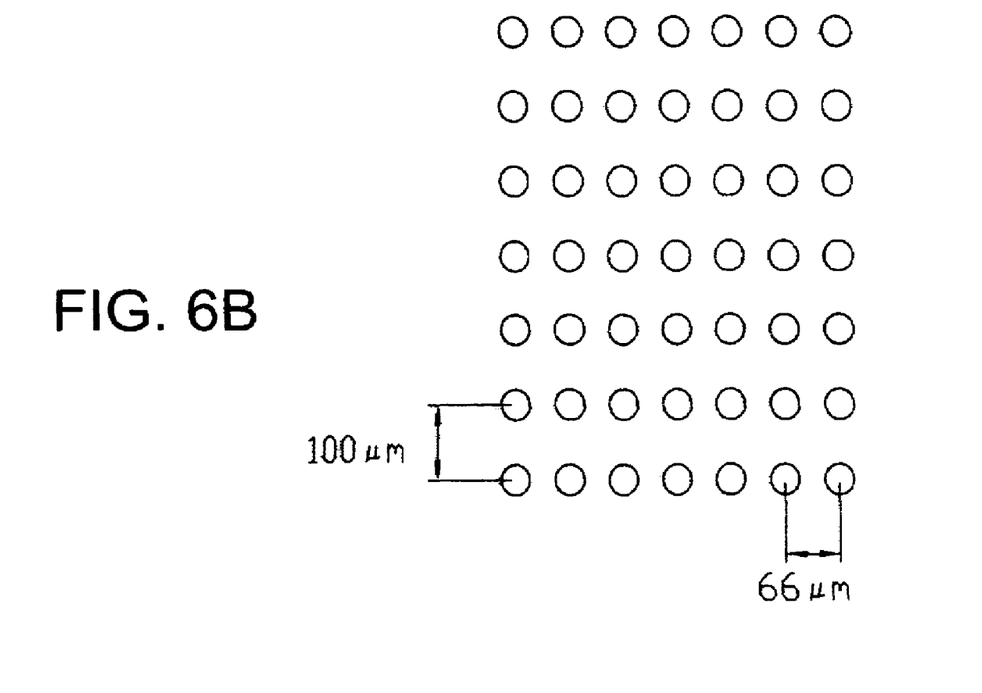

Accordingly, at the discharge device 6, the quantities of an alignment layer material to be applied on the central part 72 and on the marginal part 74 are adjusted by changing the quantities of the alignment layer material to be discharged onto the central part 72 and onto the marginal part 74 via the nozzle surface 26. For example, the ink containing the alignment layer material is discharged onto the central part 72 with the droplet quantity of 13.0 ng/dot and with the drop pitch of 66×100 µm, as shown in FIG. 6A. Meanwhile, the alignment layer material is discharged onto the marginal part 74, for example, with the droplet quantity of 12.0 ng/dot and with the drop pitch of 66×100 µm, as shown in FIG. 6B. Here, at the discharge device 6, different quantities of the alignment layer material are discharged onto the central part 72 and onto the marginal part 74, by differentiating, for the nozzles formed on the nozzle surface 26, the driving waveform for discharging the alignment layer material onto the central part 72 from that for discharging the material onto the marginal part 74 in order to change the size of droplets to be discharged.

Figure 7:
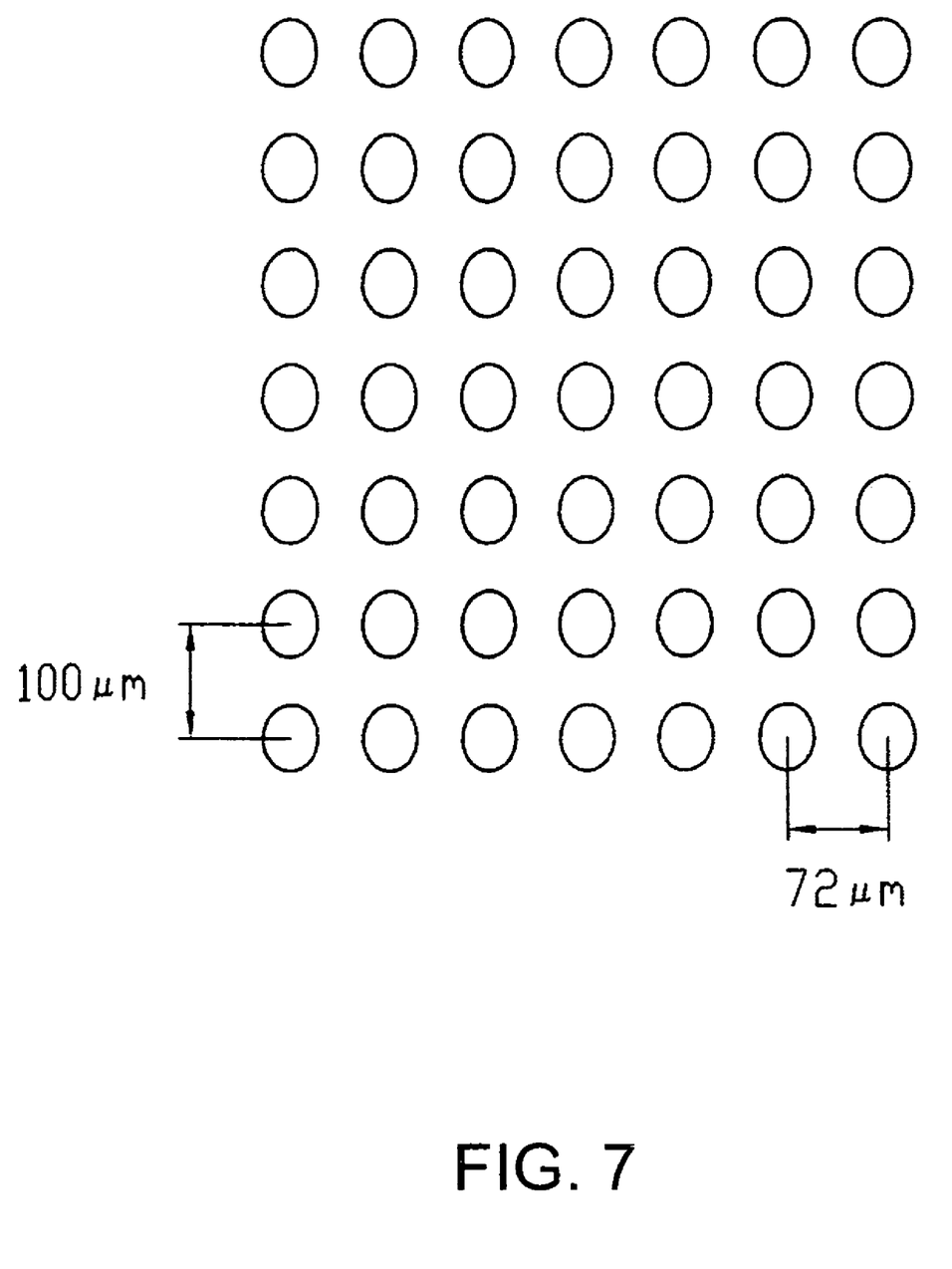
FIG. 7 is a diagram explaining the drop pitch of an alignment layer material according to the exemplary embodiment.

Further, it is also acceptable to discharge ink containing the alignment layer material onto the central part 72, for example, with the droplet quantity of 13.0 ng/dot and with the drop pitch of 66×100 µm, as shown in FIG. 6A, while discharging the ink onto the marginal part 74, with the droplet quantity of 13.0 ng/dot and with the drop pitch of 72×100 µm, as shown in FIG. 7. Specifically, different quantities of the alignment layer material may be discharged onto the central part 72 and onto the marginal part 74 by changing the drop pitch instead of changing the size of droplets to be discharged. Note that if it is difficult to change drop pitch because the discharge device has only one inkjet head, drop pitch may be changed using a discharge device having a plurality of inkjet heads.

The substrate in which different quantities of an alignment layer material are applied on the central part 72 and on the marginal part 74, for example the substrate 52, is left and kept horizontally at the discharge device 6, for example, for a minute to be leveled, and then is moved onto the belt conveyor BC from the table 28, and then is conveyed to the drying device 8 via the belt conveyor BC.

Next, the alignment layer material applied on the substrate is preliminarily dried (Step S12). Specifically, the substrate conveyed to the drying device 8 via the belt conveyor BC, for example the substrate 52, is brought into the drying device 8 and is preliminarily dried at a temperature, for example, in the range of 60 to 100 degrees centigrade. Further, the substrate 52 on which the applied alignment layer material has been preliminarily dried is moved onto the belt conveyor BC, and then is conveyed to the baking device 10 via the belt conveyor BC.

Next, the preliminarily dried alignment layer material can be baked (Step S13). Specifically, the substrate conveyed to the baking device 10 via the belt conveyor BC, for example the substrate 52, is brought into the baking device 10, and then is baked at a temperature, for example, in the range of 180 to 250 degrees centigrade. Further, the substrate 52 on which the alignment layer (for example, the alignment layer 60 in FIG. 3) is formed through the baking is moved onto the belt conveyor BC, and then is conveyed to the rubbing device 12 via the belt conveyor BC.

Next, the alignment layer 60 formed on the substrate is rubbed (Step S14). Specifically, the substrate conveyed to the rubbing device 12 via the belt conveyor BC, for example the substrate 52, is brought into the rubbing device 12, and the alignment layer 60 formed on the substrate 52 is rubbed, for example, using a cloth as a rubbing process. Then, after the rubbing process is carried out for the alignment layer 60, the substrate 52 is moved onto the belt conveyor BC, and then it is accommodated into a substrate accommodation cassette or the like (not shown) via the belt conveyor BC. Further, the substrate 52 accommodated in the substrate accommodation cassette or the like (not shown) is attached, at an assembly device (not shown), to the substrate 54 on which the color filter 62, the black matrices 64, the overcoat membrane 66, and the common electrode 68 have been formed. Then, liquid crystal is injected between the substrate 52 and the substrate 54 to produce the liquid crystal display 50 shown in FIG. 3.

Figure 8A:
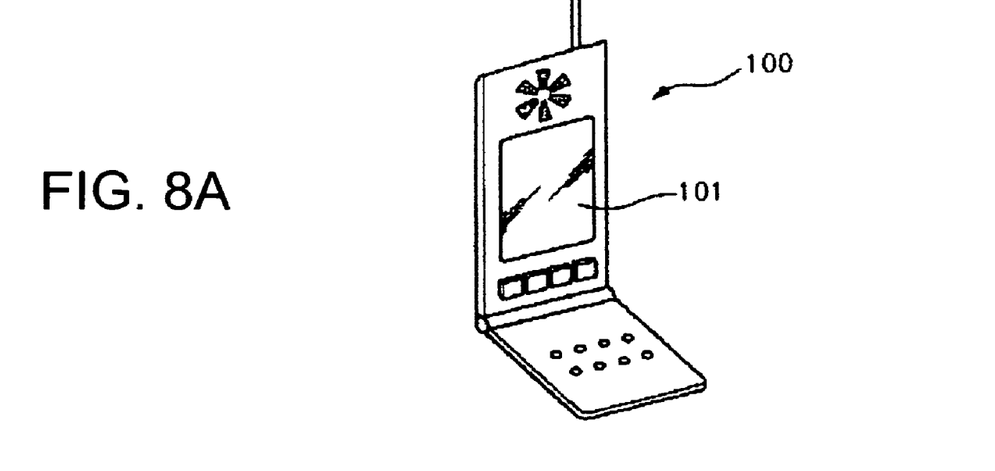
FIGS. 8A to 8C are perspective views showing examples of an electronic apparatus including a liquid crystal display according to the exemplary embodiment.
Figure 8B:
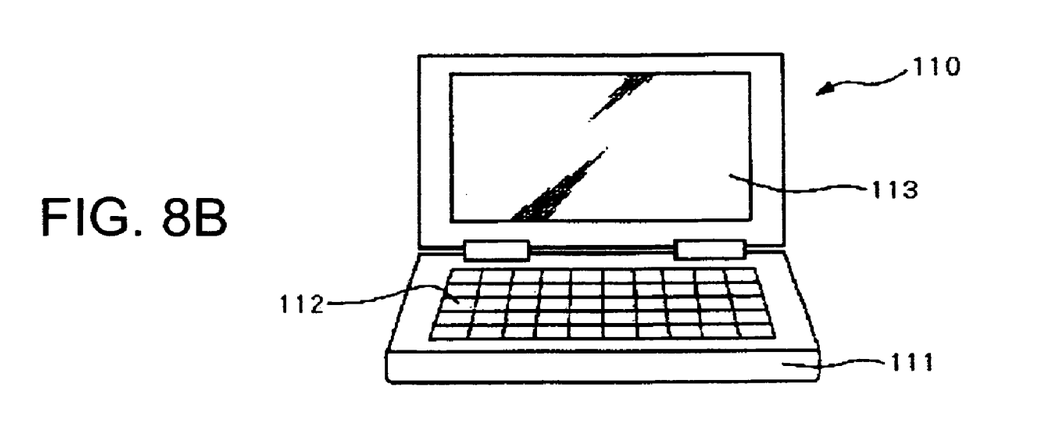
Figure 8C:
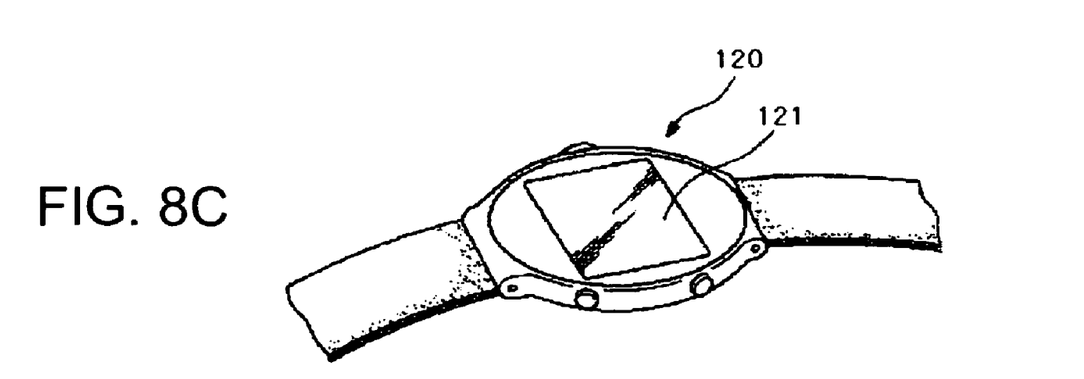

Next, electronic apparatuses having a liquid crystal display that is manufactured in accordance with the liquid crystal display manufacturing method according to the exemplary embodiment of the invention will hereinafter be described. FIGS. 8A to 8C are perspective views showing examples of electronic apparatuses having a liquid crystal display that is manufactured in accordance with the liquid crystal display manufacturing method according to the exemplary embodiment of the invention.

FIG. 8A is a diagram showing an example of cellular phones having a liquid crystal display. As shown in FIG. 8A, a cellular phone 100 has, as a display screen, a liquid crystal display 101 that is manufactured in accordance with the liquid crystal display manufacturing method according to the exemplary embodiment of the invention. Further, FIG. 8B is a diagram showing an example of portable information processing terminal devices (such as portable word processors or portable personal computers) that have a liquid crystal display. As shown in FIG. 8B, an information processing device 110 includes a main information processing unit 111, an input unit 112 having a keyboard and the like, and a liquid crystal display 113 manufactured in accordance with the liquid crystal display manufacturing method according to the exemplary embodiment of the invention. Further, FIG. 8C is a diagram showing an example of watches that have a liquid crystal display. As shown in FIG. 8C, a watch 120 has, as a display screen, a liquid crystal display 121 manufactured in accordance with the liquid crystal display manufacturing method according to the exemplary embodiment of the invention.

According to the liquid crystal display manufacturing system of the exemplary embodiment of the invention, the material applying area is divided into a central part and a marginal part, and quantities of an alignment layer material to be applied are changed depending on the central part and on the marginal part. Specifically, by applying a smaller quantity of an alignment layer material on the marginal part than the quantity on the central part, the thickness of the alignment layers formed through the drying process of the applied alignment layer material can be equalized on the central part and on the marginal part. Therefore, a uniform alignment layer can be formed on the substrate and display defect can accordingly be reduced or suppressed.

Further, according to the liquid crystal display manufacturing method of the exemplary embodiment of the invention, the thickness of the alignment layers formed through the drying process of the applied alignment layer material can be equalized by dividing the material applying area into a central part and a marginal part and then applying a smaller quantity of an alignment layer material on the marginal part than the quantity on the central part. Therefore, even in the case of using a discharge device, a uniform alignment layer can be formed on the substrate and display defect can accordingly be reduced or suppressed.

Further, in the liquid crystal display manufacturing system of the above-described exemplary embodiment, an alignment layer material can be applied appropriately and easily on a predetermined area, with a predetermined quantity, and in a short period of time, because a discharge device is used for applying the alignment layer material on a substrate. In addition, an alignment layer material can be used appropriately and without waste even in the case of using a substrate of great dimensions because the alignment layer material can be applied with a predetermined quantity and on a predetermined area.

Further, according to the liquid crystal display of the above-described exemplary embodiment, display defect can be appropriately prevented because the film thickness of the formed alignment layer is uniform due to the liquid crystal display manufacturing method according to the exemplary embodiment.

Further, according to the electronic apparatuses of the above-described exemplary embodiment, the yield rate of electronic apparatuses can be improved due to the installed liquid crystal display that is manufactured according to the liquid crystal display manufacturing method of the above-described exemplary embodiment. In addition, the use of a discharge device leads to the reduction of the quantity of an alignment layer material to be used, which can accordingly lower the manufacturing cost of electronic apparatuses and in turn the price of electronic apparatuses.

Although, in the liquid crystal display manufacturing system of the above-described exemplary embodiment, the marginal part is defined as the periphery area with the width of 2 mm of the material applying area, any area, such as the periphery area with the width of 1 mm, or the periphery area with the width of 5 mm, may be the marginal part Specifically, any marginal part can be defined according to the type of alignment layer materials, solvent component, the percentage of the solvent component and so forth, the remaining part being defined as a central part. Alternatively, the material applying area can be divided also into three parts, such as into a marginal part, an intermediate part, and a central part.

Moreover, although, in the liquid crystal display manufacturing system of the above-described exemplary embodiment, the alignment layer material is discharged with the droplet size of 13.0 ng/dot and 12.0 ng/dot, any size of droplets can be set according, for example, to the type of alignment layer materials and the like. Further, any drop pitch of an alignment layer material can also be defined according, for example, to the type of alignment layer materials and the like.

The invention claimed is:

1. A method for manufacturing a liquid crystal display having a liquid crystal layer interposed between a pair of substrates, the method comprising:

discharging a droplet containing an alignment layer material onto a substrate, different quantities per unit area of the alignment layer material being applied depending on a specific area on the substrate by using a droplet discharge device; and drying the alignment layer material applied in the discharging of a droplet to form an alignment layer.

2. The method for manufacturing a liquid crystal display according to claim 1, the discharging of a droplet including:

changing, depending on the specific area, a size of the droplet containing the alignment layer material to be discharged onto the substrate by the droplet discharge device to apply different quantities per unit area of the alignment layer material depending on the specific area.

3. The method for manufacturing a liquid crystal display according to claim 1, the discharging of a droplet including:
changing, depending on the specific area, a drop density of the droplet containing the alignment layer material to be discharged onto the substrate by the droplet discharge device to apply different quantities per unit area of the alignment layer material depending on the specific area.

4. The method for manufacturing a liquid crystal display according to claim 1, the discharging of a droplet including:
dividing a specific area on the substrate to which the droplet containing the alignment layer material is discharged into a marginal area and a central area surrounded by the marginal area to apply a smaller quantity per unit area of the alignment layer material on the marginal area than a quantity per unit area of the alignment layer material applied on the central area.

5. A system for manufacturing a liquid crystal display having a liquid crystal layer interposed between a pair of substrates, comprising:
a droplet discharge device that discharges a droplet containing an alignment layer material to be applied on a substrate, the droplet discharge device applying different quantities per unit area of the alignment layer material depending on a specific area on the substrate; and
a drying device for drying the alignment layer material applied by the droplet discharge device on the substrate to form an alignment layer.

6. The system for manufacturing a liquid crystal display according to claim 5, the droplet discharge device changing, depending on the specific area, a size of the droplet containing the alignment layer material to be discharged onto the substrate to apply different quantities per unit area of the alignment layer material depending on the specific area.

7. The system for manufacturing a liquid crystal display according to claim 5, the droplet discharge device changing, depending on the specific area, a drop density of the droplet containing the alignment layer material to be discharged onto the substrate to apply different quantities of the per unit area alignment layer material depending on the specific area.

8. The system for manufacturing a liquid crystal display according to claim 5, a specific area on the substrate to which the droplet containing the alignment layer material is discharged being divided into a marginal area and a central area surrounded by the marginal area, and the droplet discharge device applying a smaller quantity per unit area of the alignment layer material on the marginal area than a quantity per unit area of the alignment layer material applied on the central area.

9. A liquid crystal display manufactured in accordance with the method for manufacturing a liquid crystal display according to claim 1.

10. An electronic apparatus, comprising the liquid crystal display according to claim 9.

* * * * *